United States Patent
Mulhern et al.

(10) Patent No.: US 7,234,554 B2
(45) Date of Patent: Jun. 26, 2007

(54) REAR WHEEL DRIVE POWER WHEELCHAIR

(75) Inventors: James P. Mulhern, Hunlock Creek, PA (US); Charles J. Martis, Wyoming, PA (US); Gerald J. White, Jr., Hunlock Creek, PA (US); Kip D. Alder, West Pittston, PA (US)

(73) Assignee: Pride Mobility Products Corporation, West Pittston, PA (US)

( * ) Notice: Subject to any disclaimer, the term of this patent is extended or adjusted under 35 U.S.C. 154(b) by 381 days.

(21) Appl. No.: 10/613,663

(22) Filed: Jul. 2, 2003

(65) Prior Publication Data

US 2005/0000742 A1 Jan. 6, 2005

(51) Int. Cl.
*B60K 1/00* (2006.01)
(52) U.S. Cl. .................................... 180/65.6
(58) Field of Classification Search ............. 180/65.6, 180/65.1, 907; 280/755, 767
See application file for complete search history.

(56) References Cited

U.S. PATENT DOCUMENTS

| 5,020,624 | A | 6/1991 | Nesterick et al. |
| 5,435,404 | A | 7/1995 | Garin, III |
| 5,540,297 | A | 7/1996 | Meier ................. 180/65.5 |
| 5,564,512 | A | 10/1996 | Scheulderman ......... 180/65.5 |
| 5,575,348 | A | 11/1996 | Goertzen et al. ........ 180/65.6 |
| 5,848,658 | A | 12/1998 | Pulver |
| 5,899,475 | A | 5/1999 | Verhaeg et al. |
| 5,904,214 | A | 5/1999 | Lin |
| 5,964,473 | A | 10/1999 | Degonda et al. ......... 280/250.1 |
| 6,070,898 | A | 6/2000 | Dickie et al. |
| 6,129,165 | A | 10/2000 | Schaffner et al. ........ 180/65.1 |
| 6,131,679 | A | 10/2000 | Pulver et al. |
| 6,135,222 | A | 10/2000 | Furukawa |
| 6,196,343 | B1 | 3/2001 | Strautnicks |
| 6,341,657 | B1 | 1/2002 | Hopely, Jr. et al. |
| 6,460,641 | B1 | 10/2002 | Kral |
| 6,494,474 | B1 | 12/2002 | Kramer, Jr. |
| 6,530,598 | B1 | 3/2003 | Kirby |
| 6,938,923 | B2 | 9/2005 | Mulhern et al. |
| 2004/0004342 | A1 | 1/2004 | Mulhern et al. |
| 2004/0035627 | A1 | 2/2004 | Richey, II et al. |
| 2004/0040769 | A1 | 3/2004 | Richey, II et al. |

FOREIGN PATENT DOCUMENTS

| DE | 299 17 475 | 12/1999 |
| FR | 2 399 822 | 3/1979 |
| GB | 2 326 138 | 12/1998 |
| JP | 57-186589 | 11/1982 |
| WO | WO 03/103366 | 12/2003 |

*Primary Examiner*—Faye M. Fleming
(74) *Attorney, Agent, or Firm*—DLA Piper US LLP (57) ABSTRACT

A curb-climbing rear wheel drive power wheelchair is disclosed having a pair of drive wheels, at least one ground-engaging idler wheel connected to the frame forward of the drive wheels and at least one anti-tip wheel mounted above ground aft of the drive wheels. Each drive wheel and an associated drive assembly are mounted to a motor support bracket that is pivoted to the frame of the wheelchair. The drive assembly is mounted such that its motor is angled upward and rearward from the bracket. The anti-tip wheel is attached to one motor support bracket such that pivoting of the motor support bracket causes vertical displacement of the anti-tip wheel.

19 Claims, 6 Drawing Sheets

REAR WHEEL DRIVE POWER WHEELCHAIR

FIELD OF THE INVENTION

This invention relates to wheelchairs and, more particularly to a rear wheel drive power wheelchair with a rear anti-tip wheel that automatically adjusts based on the operational state of the wheelchair.

BACKGROUND OF THE INVENTION

Wheelchairs for use by handicapped and disabled persons have been well known for many years. These wheelchairs fall into two basic categories, manual wheelchairs and power wheelchairs. Power wheelchairs use a motor system for driving one set of wheels on the chair. Depending on the location of the set of wheels that are driven, the wheelchair is categorized as either a front, mid or rear wheel drive wheelchair. Each type of chair has its advantages, disadvantages and design complexities.

In a rear wheel drive wheelchair, the wheelchair includes powered wheels that have an axis typically behind the center of gravity of the wheelchair and occupant. In this chair, there are generally two caster wheels that contact the ground located at or near the front of the chair. These front casters provide support and balance for the wheelchair. Rear wheel drive power wheelchairs also typically have small anti-tip wheels on rigid mountings to the rear which are designed to catch the wheelchair if it should start to tip backwards.

One example of a rear wheel drive power wheelchair is shown in U.S. Pat. No. 5,540,297 to Meier. This wheelchair has the large powered wheels mounted on sprung trailing arms, and has the rear anti-tip wheels mounted on the ends of the trailing arms.

Power wheelchairs are also known in which the drive wheels are positioned forward of the center of gravity, and the wheelchair normally rests on the drive wheels and on rear caster wheels. These include wheelchairs, known as mid-wheel drive power wheelchairs, in which the drive wheels are aligned close to the position of the center of gravity. In this type of wheelchair, anti-tip wheels are provided at the front to support the wheelchair if it should tip forwards and to assist it in climbing curbs and ramps. Commonly-assigned U.S. Pat. No. 6,129,165 shows a mid-wheel drive power wheelchair in which the front anti-tip wheels are inter-linked to the drive wheel suspension.

One of the deficiencies with conventional rear wheel drive power wheelchairs has been that the anti-tips wheels that are located on the rear of the frame are typically fixed mounted such that there is no vertical change in position. This type of arrangement can pose a problem when accelerating on an incline.

Also, in rear wheel drive power wheelchairs, because of the location of the drive wheels aft of the center of gravity, the wheel base tends to be fairly long, thus increasing the turning radius of the wheelchair.

A need, therefore, exists for an improved rear wheel drive power wheelchair.

SUMMARY OF THE INVENTION

The present invention provides a power wheelchair that normally rests on drive wheels to the rear of its center of gravity and on at least one caster wheel in front of its center of gravity. The wheelchair has at least one anti-tip wheel rearward of the drive wheels which is normally positioned above the ground when the wheelchair is resting on level ground. The wheelchair includes a drive assembly for driving the rear wheels. The drive assembly is mounted on a bracket which positions the drive assembly forward of its mounting point to the main frame and on an upward angle relative to the axis of the chair.

The anti-tip wheel is connected to the drive assembly mounting bracket such that rotation of the mounting bracket causes the rear anti-tip wheel to move upward or downward. For example, the rear anti-tip wheel is urged downwards when the wheelchair is accelerating, or is going uphill, to reduce the risk that the wheelchair will topple backwards. Conversely, the anti-tip wheel is urged upwards when descending a curb, to assist in maintaining adequate traction by the drive wheels.

In one aspect of the invention, a resilient suspension connects the drive wheels to the frame of the wheelchair to resiliently resist pivotal movement of the drive wheels about its pivotal mounting axis.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For purposes of illustrating the invention, the drawings show one or more forms in which the invention can be embodied. The invention is not, however, limited to the precise forms shown unless such limitation is expressly made in a claim. In the drawings:

DETAILED DESCRIPTION OF THE DRAWINGS

Figure 1:
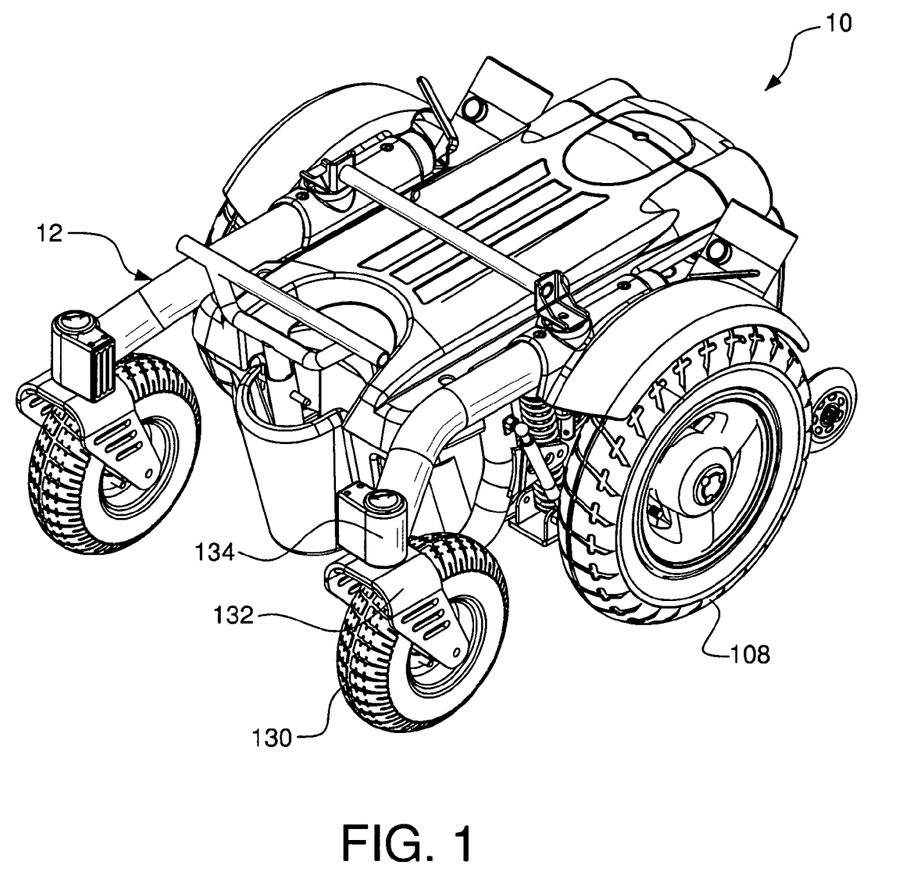
FIG. 1 is an isometric view of one embodiment of a power wheelchair assembly according to the present invention with the seat removed for clarity.

Referring to the drawings, where like numerals identify like elements, one form of a power wheelchair is shown and is designated generally by reference numeral 10. The power wheelchair 10 as shown in FIG. 1 includes a body in the form of a frame 12, with a variety of equipment mounted within and around the frame. A seat is typically mounted to the top of the frame, but is not shown in the figures for clarity. The wheelchair frame 12 is mounted on wheels and suspension mechanisms that will be described in more detail below.

Figure 2:
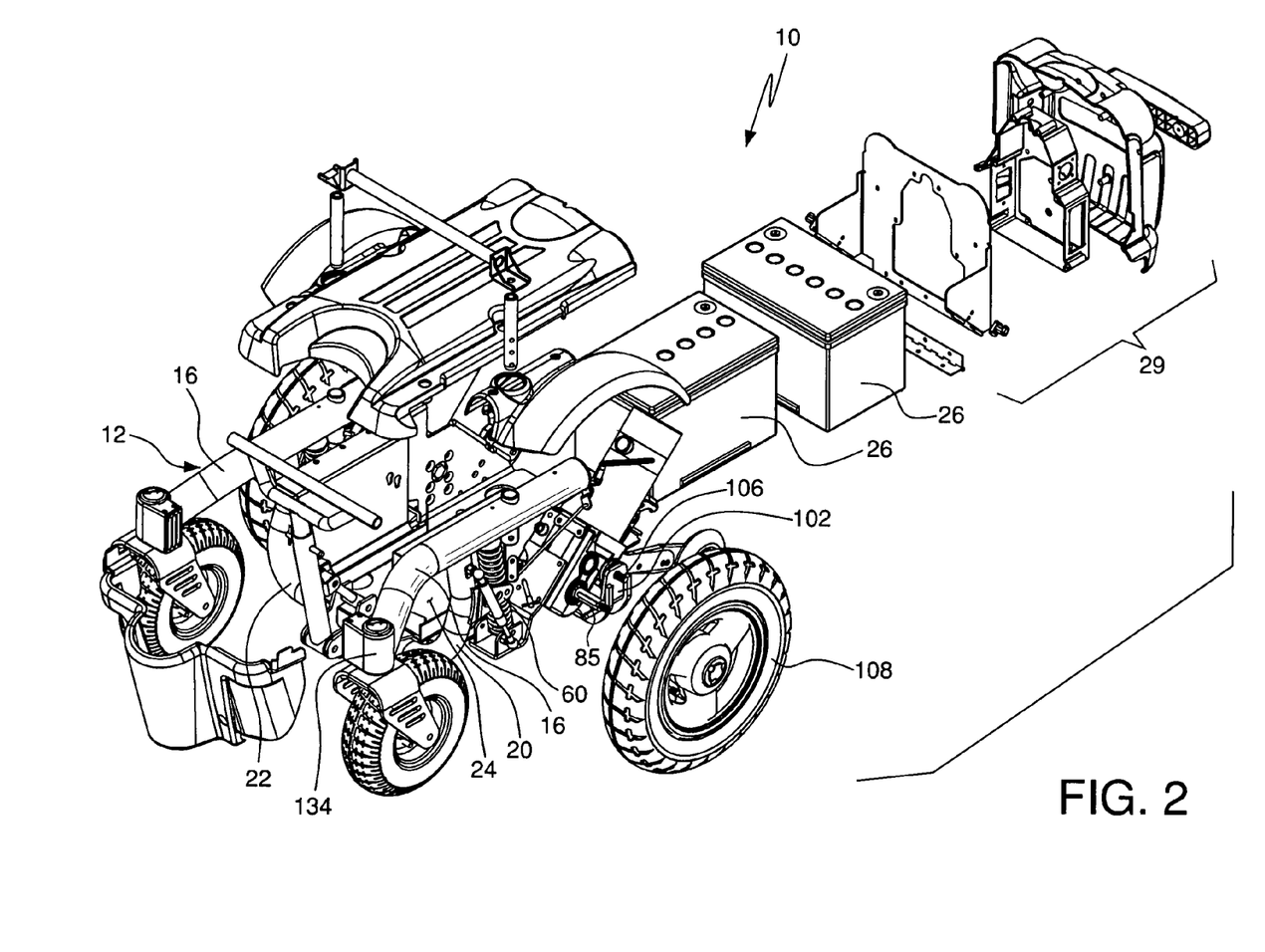
FIG. 2 is an exploded view of the wheelchair shown in FIG. 1.
Figure 3:
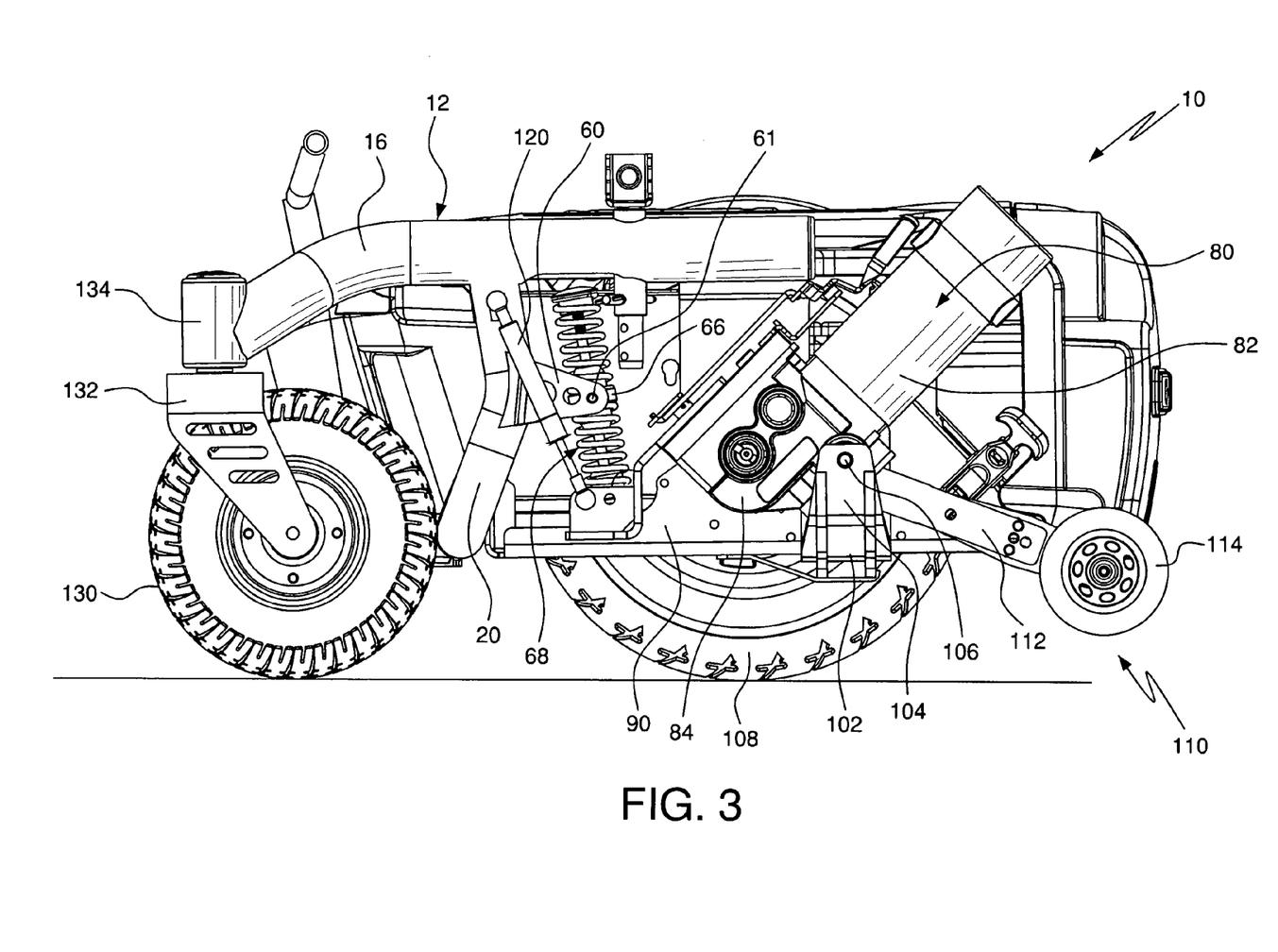
FIG. 3 is a side view of the wheelchair of FIG. 1 with the left side drive wheel removed to illustrate various features of the invention.

As shown in FIGS. 2 and 3, the frame 12 includes two longitudinally extending upper members or beams 16. While only one upper beam is shown, there is a similar beam located on the opposite side of the wheelchair and extending substantially parallel to the illustrated member. The frame 12 is preferably fabricated from hollow tubular components with a cylindrical or rectangular cross-section. The components are welded or otherwise attached together to form the frame. Preferably, the members are made from metallic material, such as steel. However, other types of materials may be used, such as plastic and composite materials.

The frame 12 further includes an upright support 20 on either side of the frame 12. Each upright support 20 is attached to and extends downward from an associated upper beam 16. As shown in FIG. 2, the upright supports 20 are preferably connected to one another at their lower end through a lower crossbar 22, thus forming a rigid attachment between the upper beams 16. The upright supports 20 are preferably attached to the upper beams 16 at a location between the front and rear ends of each upper beam 16. In the illustrated embodiment, the upright supports 20 and the crossbar 22 are formed as one integral tubular piece. However, it is also contemplated that the upright supports 20 and the crossbar 22 may be formed from separate components that are attached to one another.

A pan 24 (see FIG. 2) is welded or otherwise attached to the crossbar 22 (and/or otherwise supported by the frame 12). The pan 24 is used to carry a power supply such as, for example, one or more batteries 26. Alternatively, the pan 24 may be removable from the frame 12 and designed to rest on or be removably attached to the crossbar 22. The batteries 26 are preferably mounted so as to be easily removable for recharging, replacement, or storage. The batteries 26 are accessible from the rear through a door assembly 29, which is mounted to the frame.

The frame 12 further includes a pair of upright mounting brackets 60, one attached to each upright support 20. In one embodiment the upright mounting brackets 60 are U-shaped channels with mounting lugs formed in the parallel sides plates of the channel. The base of the channel is attached to the upright support 20 such that the lugs project rearwardly. The lugs include aligned apertures which receive a pin 61 for mounting a suspension plate 66 that supports a suspension spring-strut assembly 68 as will be discussed in more detail below.

The power wheelchair 10 includes a pair of drive assemblies indicated generally by the reference numeral 80. Each drive assembly 80 includes a motor 82 and a transmission 84. The motor and transmission are conventional in the art and, therefore not further discussion is necessary. The drive assembly includes a drive shaft 85 which is engaged with one of the drive wheels for rotating the drive wheel about a drive axis 87. Each drive assembly 80 is mounted on a motor support or mounting bracket 90. The attachment of the drive assembly to the bracket 90 is such that the drive assembly 80 extends rearward and upward at an angle within a range from the horizontal in the static condition (i.e., prior to loading of the chair). The angle is selected so that when the motor pivots during use it preferably does not extend beyond the back edge of the chair, and does not interfere with the movement of the seat. If the angle of the motor is set too high, the rearward motion of the chair may be inhibited.

Also, one of the goals of the present invention is to reduce the wheelbase of the chair (i.e., the distance between front and back wheels.) In conventional motor mounting arrangements, the location of the motor tends to dictate a relatively large spacing between the front and rear wheels. However, one of the problems with shortening the wheelbase by moving the wheels closer to one another is that the chair tends to become more prone to forward tipping when occupied by a user. The present invention reduces the spacing between the wheels by placing the motor rear of the drive wheels and at an angle to the horizontal. The mass of the motor provides a moment which tends to counteract the forward tipping.

In the illustrated embodiment, the drive assembly 80 is set at approximately 45 degrees from the horizontal. The movement of the drive assembly 80 during operation is approximately +/−10 degrees. Thus, the drive assembly is positioned during use at an angle in a range of between approximately 35 and 55 degrees. In another, more preferred embodiment, the drive assembly 80 is mounted so as to be at an angle from the horizontal of between approximately 25 to 30 degrees. This alternate embodiment permits additional rearward travel of the seat.

The motor support bracket 90 includes a suspension mount 92 which is attached to or formed integral with the support bracket 90 forward of the drive axis. The suspension assembly 68 is attached to the suspension mount 92 and the upright mounting bracket 60. More particularly, the strut portion of the spring-strut assembly 68 is pivotally attached at one end to the suspension mount 92. The strut extends through the suspension plate 66 which is pinned to the upright mounting bracket 60. A lower spring 94 is preferably disposed about the lower portion of the strut and located between the suspension plate 66 and the attachment of the strut to the suspension mount 92. An upper spring 96 is preferably disposed about the upper portion of the strut and located between the suspension plate 66 and an upper end of the strut. The upper end of the strut is preferably threaded. A bolt 98 or similar fastener is attached to the upper end of the strut. A retention cap 100 is located between the bolt and the upper end of the upper spring 96. As should be apparent, tightening of the bolt 98 causes the upper spring 96 to compress, thus changing the spring force provided by the upper spring 96. Spring-strut assemblies are well known and, therefore, no further discussion is needed. The springs are preferably coil springs.

A second strut 120 is preferably attached at one end to the suspension mount 92. The upper end of the second strut 120 preferably attaches to the frame 12. The second strut 120 provides a level of dampening for the system. Without the strut, the active biasing of the springs would result in chattering of the drive wheels when changing terrain, such as when transitioning off a curb.

The drive assembly 80 is also pivotally mounted to the frame. More particularly, a motor mount 102 is attached to and extends outward from each side of the frame 12. The motor mount 102 includes an upwardly projecting leg 104. A pivot shaft 106 is attached to the leg 104 so as to extend horizontally from the leg. The drive assembly 80 includes a mounting aperture within which the pivot shaft 106 is rotatably disposed. This mounting arrangement permits each drive assembly 80 to independently pivot about an associated pivot shaft 106. The mounting aperture is located aft of the axis of the drive wheel, thus providing a pivot mounting location that is aft of the drive wheels.

The mounting arrangement described above allows each drive assembly 80 to pivot about the pivot shaft 106 as a single unit, through a limited arc in a vertical, fore-and-aft plane relative to the frame 12 of the wheelchair 10. The spring-strut assembly 68 biases the drive assembly into a neutral position.

The drive wheels 108 are connected to the frame 12 so as to be rotatable about transverse axes defined by the stub axles 85, and so as to be movable up and down in an arcuate manner about the pivot shaft 106. Hence, each drive wheel 108 is free to move relative to the frame 12 independently of the remaining drive wheel 108 upon encountering an obstacle.

As described above, the axes of rotation 87 of the wheels 108 are under a rear portion of the seat 14, aft of the center of gravity of the occupant. The drive motors 82 are independently controllable, thereby permitting independent rotation of each drive wheel 108.

Attached to each motor support bracket 90 and/or the drive assembly 80 and extending rearward (and preferably downward) therefrom is a rear anti-tip wheel assembly 110. The assembly 110 includes an anti-tip wheel support arm 112 with is preferably bolted to the transmission 84 to the motor support bracket 90 at one end. A rear anti-tip wheel 114 is rotatably mounted to the other end of the support arm 112 and positioned off the ground. The rear anti-tip wheels 114 provide protection against tipping in the event of rearward pitching of the wheelchair 10, such as might result from a forward encounter with an obstacle, ascending a significant upgrade, sudden acceleration or the like.

In the resting position of the wheelchair 10, most of the weight of the wheelchair and user is transmitted from the frame 12 to the drive wheels 108 through the motor mounts 102 and the suspension assemblies 68. The lower springs 94 provide the primary spring suspension for the wheelchair 10. The upper springs 96, which act in opposition to the lower springs 94, serve primarily to provide resiliency to the anti-tip wheel 114, to steady the suspension assemblies 68 if the anti-tip wheels 114 should move upward far enough, or suddenly enough, that the upper springs 96 are no longer in compression.

The wheelchair 10 further includes at least one and more preferably two idler wheels 130, which are the front ground-engaging wheels of the wheelchair. The drive wheels 108 are the rear ground-engaging wheels of the wheelchair 10. The front ground-engaging wheels 130 are caster-type idler wheels. As is well known for caster wheels, the wheels 130 are rotatably mounted in forks or yokes 132 for rotation about horizontal axes. The forks 132 are pivotally mounted in bearings 134 for swiveling about generally vertical axes. The swivel axes of the forks are on the centerlines of the wheels, but are offset from the axes of rotation of the wheels. Thus, as the wheelchair moves, the caster wheels 130 naturally align themselves to trail behind their respective swivel bearings 134.

The curb-climbing power wheelchair 10, as illustrated in the drawings, has the drive wheels 108 positioned closer toward the longitudinal center of the wheelchair than conventional rear-wheel drive wheelchairs. This is possible because the rear anti-tip wheels 114, by rising and lowering in response to the motion of the wheelchair, provide protection against overbalancing without unduly hindering the ability of the wheelchair to descend curbs and the like. This allows the drive wheels 108 to be placed close to the center of gravity of the wheelchair and occupant. This configuration concentrates, and effectively maximizes, the weight on the drive wheels 108. Several benefits are achieved by this design. Firstly, overall traction is increased. With increased traction comes better obstacle-climbing ability, increasing the overall capability and usability of the wheelchair. Additionally, with increased traction, deceleration is more positive and more predictable.

The increased traction also results in superior straight-line stability. Having the center of mass close to the axis of the drive wheels reduces the "pendulum effect" present in many prior art power wheelchairs.

Additionally, the increased traction provides for more accurate response of the curb-climbing power wheelchair to inputs provided by the wheelchair user through a joystick control. This translates into more predictable and positive handling and a much easier learning curve for the curb-climbing power wheelchair user when the user is first becoming accustomed to the wheelchair.

Yet another benefit of the geometry of the power wheelchair is an extremely tight turning radius. The independent rotation of the drive wheels in opposite directions enables the wheelchair to rotate about any point on the common axis of the drive wheels. This, combined with the central location of that axis, allows the user of the curb-climbing power wheelchair to gain access to, and to turn around in, confined areas such as those encountered in hallways, bathrooms, small kitchens, and office areas.

When a caster wheel 130 encounters an obstacle, the torque generated by the drive wheels 108 causes the caster wheels 130 to begin to ride over the obstacle, thus moving the front of the frame 12 upwards. The frame 12, through the suspension assembly 68, applies an upward force on the suspension mount 92 of the motor support bracket 90. This causes the motor support bracket 90 to pivot about the pivot shaft 106 in the opposite direction from the torquing of the drive wheels 108, resulting in the rear anti-tip wheels 114 being translated downward toward the ground. Hence, in the event of the wheelchair begins to tip backward, the rear anti-tip wheels 114 are better positioned to contact the ground and support the wheelchair. This movement of the suspension assembly is depicted in FIG. 4B.

At the same time that the rear anti-tip wheel 114 is being driven toward the ground, the pivoting of the motor support bracket 90 produces compression of the lower spring 94. The compression of the lower spring 94 creates a restoring force (i.e., biasing) that urges the motor support bracket 90 to rotate in the opposite direction about the pivot 106, returning the motor support bracket to its original position once the motor torque has been reduced.

Figure 4A:
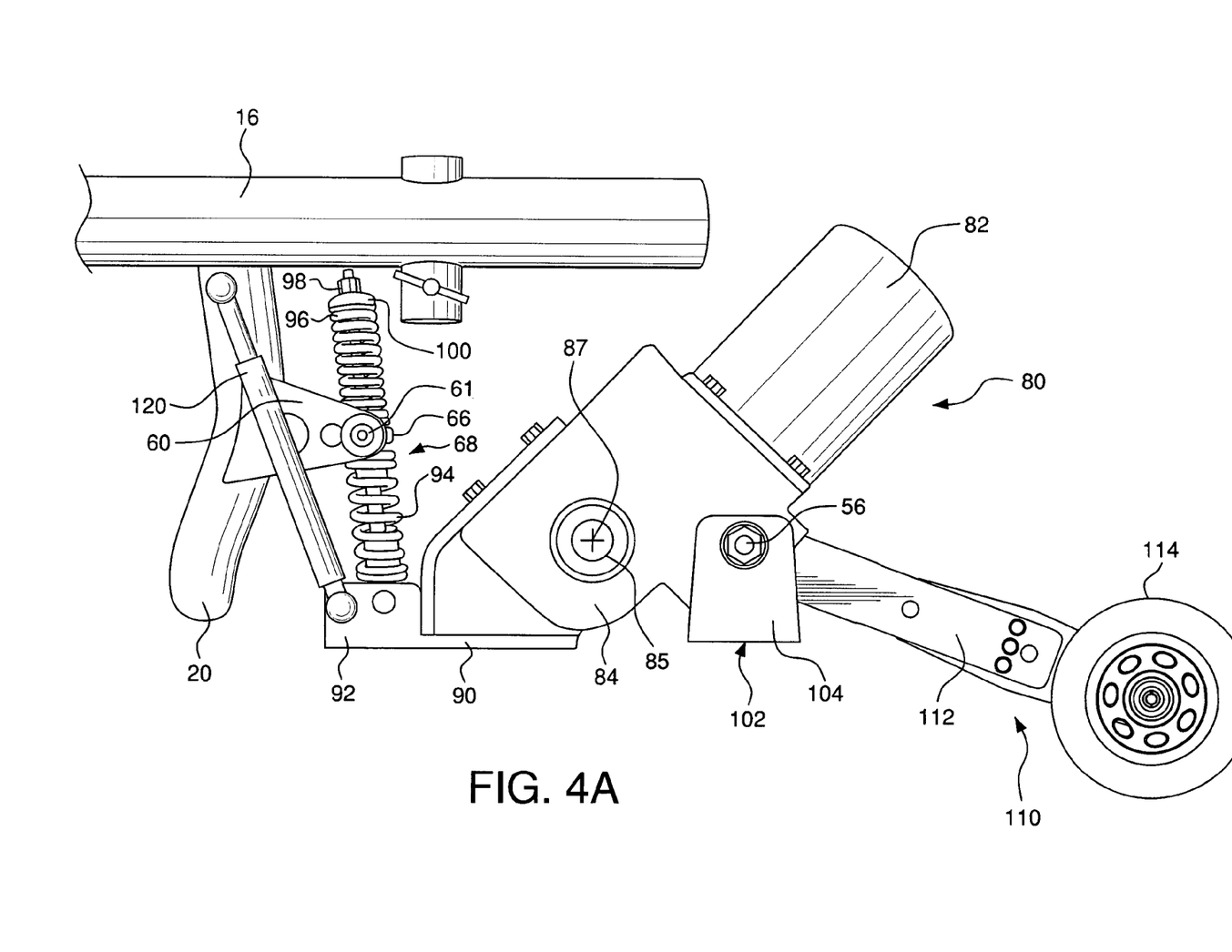
FIG. 4A is a schematic representation of the drive assembly mounting arrangement according to the present invention in its non-deflected position.
Figure 4B:
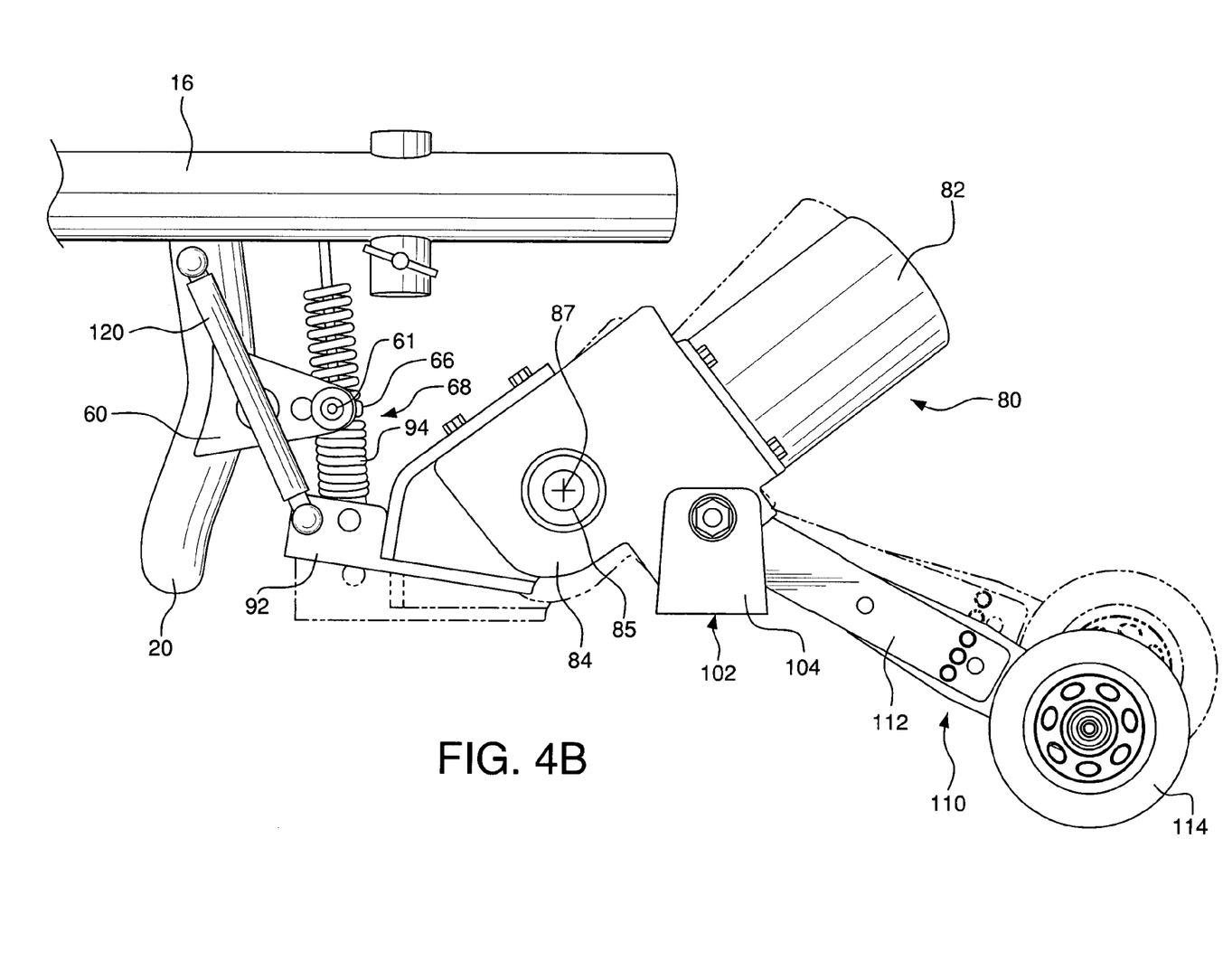
FIGS. 4B and 4C are schematic representations of the drive assembly mounting arrangement according to the present invention in two opposite deflected positions.

Similarly, when the user commands forward acceleration of the wheelchair 10, a torque is created in a direction opposite the direction of rotation of the drive wheel 108 (i.e., in the clockwise direction as seen in FIG. 4A). This rotation urges the rear anti-tip wheels 114 toward the ground, thus providing increased protection against tipping due to the commanded acceleration. The rotation of the motor support bracket 90 produces compression of the lower spring 94 as discussed above.

As the load on the wheelchair increases, such as when climbing a hill, the amount of torque needed to move the wheelchair increases. This, in turn, causes the anti-tip wheels to move closer to the ground. Thus, in situations where there is a chance for instability, the anti-tip wheels are closer to the ground. Accordingly, the system self-compensates to adjust for changes in operation. This adjustment is shown in FIG. 4B.

Another example of the self compensating aspect of the invention is in situations where the wheelchair is facing uphill and is decelerating backward. This motion produces a deceleration which, again, lowers the anti-tip wheels closer to the ground.

Figure 4C:
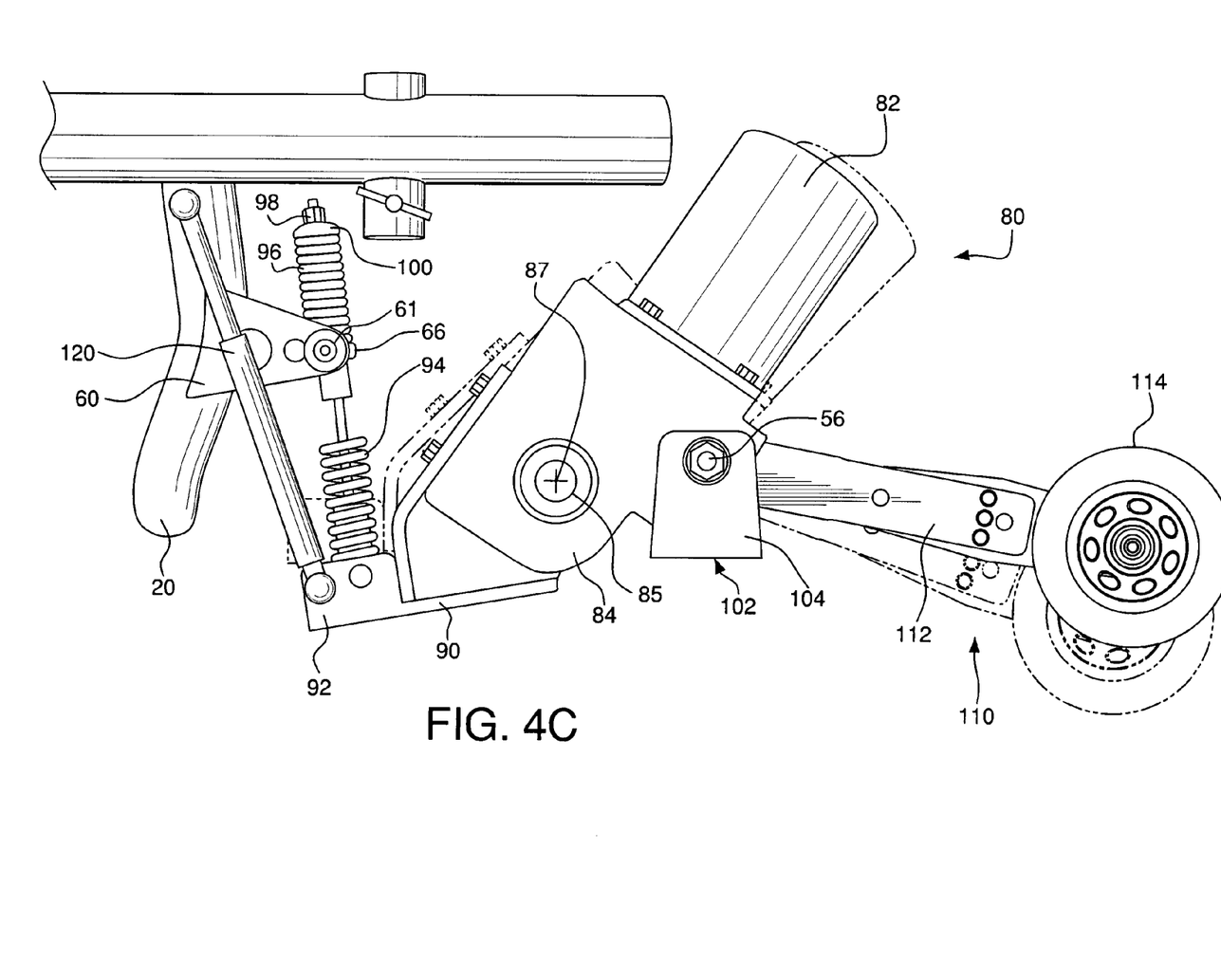

When the wheelchair 10 descends from a curb or other elevated area to a lower position, the user naturally tends to reduce the speed of the wheelchair. The braking of the drive wheels 108 results in a reaction torque on the drive assembly 80 that tends to cause the motor support bracket 90 to rotate in the same direction as the drive wheels (i.e., counter-clockwise as seen in FIG. 4A), raising the anti-tip wheels 114 further from the ground (as shown in FIG. 4C). When descending a curb, the rear anti-tip wheels 114 may contact the top of the curb. If this happens, the motor support bracket 90 will rotate further counter-clockwise. In these conditions, the upper spring 96 will compress, absorbing some of the upward force caused by the contact with the curb. The counter-clockwise rotation of the motor support bracket 90 will cause the drive wheels to move downward. The result of this is that the drive wheels 108 will contact the ground below the curb sooner, and more gently, than would be the case with fixed anti-tip wheels. The downward force, in addition to maintaining the drive wheels 108 in contact with the ground, also increases the traction of the drive wheels 108 since they are urged into contact with the ground. The energy stored in the upper springs 96 is released as the rear anti-tip wheels 114 roll off of the curb.

The wheelchair 10 further preferably includes an outer shell that both provides a decorative, aesthetically pleasing appearance for the wheelchair and protects the wheelchair user from contact with the batteries 26 and with the electrical connections between the batteries 26 and the motors 82. The shell further provides protection for the batteries 26, and to some extent for the motors 82 and the transmissions 84. Such shells are well known. See, for example, commonly assigned U.S. Pat. No. 5,944,131. In the interests of clarity, the wheelchair 10 has been shown in the drawings without the shell.

By orienting the drive assemblies 80 such that the motor assemblies are angled upward and rearward, the distance between the front caster 130 and the drive wheel 108 can be shortened. To further enhance the weight distribution of the wheelchair, the present invention is designed such that the batteries 26 are positioned further aft with one preferably oriented at 90 degrees to the other. In order to provide access to the batteries, a rear door assembly 29 is hinged to the floor pan 24, thus permitting easy sliding of the batteries in to and out of the battery compartment. Also, the rear battery is located aft of the drive wheels providing an additional moment to counteract the tendency of the chair to tip forward.

The present invention as described above and illustrated in the exemplary drawings provides a novel rear wheel drive wheelchair which actively controls the positioning of the rear anti-tip wheels depending on the operational state of the wheelchair to enhance stability.

The present invention may be embodied in other specific forms without departing from the spirit or essential attributes and, accordingly, reference should be made to the appended claims, rather than to the foregoing specification, as indicating the scope of the invention.

What is claimed is:

1. A power wheelchair comprising:
   a frame;
   a pair of drive wheels, each wheel having an axis of rotation;
   two drive assemblies, each for driving a respective drive wheel;
   a pair of motor support brackets, each motor support bracket attached to a drive assembly, each motor support bracket being pivotally attached to the frame such that the bracket and drive assembly combination can pivot with respect to the frame, the drive assembly being attached to the motor support bracket such that the drive assembly extends upward and rearward from the bracket;
   a spring suspension assembly attached to the motor support bracket forward of the attachment of the drive assembly, the spring suspension assembly being attached to the frame;
   at least one ground-engaging idler wheel connected to the frame in front of said drive wheels; and
   at least one anti-tip wheel positioned above ground in a normal resting state of the wheelchair and connected to one drive assembly such that pivoting of the drive assembly produces movement of the anti-tip wheel toward or away from the ground.

2. A power wheelchair according to claim 1, further comprising a second anti-tip wheel, each anti-tip wheel being connected to respective drive assembly.

3. A power wheelchair according to claim 2, wherein the frame includes at least two longitudinal beams, each longitudinal beam having an upright support attached to it, and a crossbar connecting each upright support, and wherein the spring suspension assembly includes at least one coil spring disposed between each upright support and the motor support bracket.

4. A power wheelchair according to claim 2, wherein the frame includes at least two longitudinal beams, each longitudinal beam having an upright support attached to it, and a crossbar connecting each upright support, and wherein the spring suspension assembly includes two spring-strut assemblies, each including a strut and an upper and lower coil spring, the lower end of the strut being attached to the motor support bracket, the upright support having an upright bracket assembly through which the strut extends, and wherein the upper coil spring is located above the upright bracket assembly and the lower spring is located between the upright bracket assembly and the motor support bracket.

5. A power wheelchair comprising:
   a frame;
   a pair of ground contacting drive wheels disposed on opposite lateral sides of the frame;
   a pair of drive assemblies, each drive assembly engaged with and adapted to drive a respective drive wheel;
   a pair of motor support brackets, one on each side of the frame and pivotally attached to the frame, one drive assembly mounted to each motor support bracket such that at least a portion of the drive assembly extends upward and rearward from the bracket;
   a pair of springs, each spring being disposed between the frame and an associated motor support bracket so as to counter-act pivoting of the motor support bracket;
   at least one ground contacting idler wheel disposed at the front of the frame; and
   at least one anti tip idler wheel mounted rearwardly of the pivotal attachment of the bracket to the frame, the anti-tip idler wheel being positioned off the ground when the wheelchair is resting on level ground, the anti-tip idler wheel attached to one drive assembly/motor support bracket combination such that the anti-tip wheel rotates in the same direction about the pivot as the drive assembly/motor support bracket combination.

6. A power wheelchair according to claim 5, wherein the at least one anti-tip idler wheel is connected to the motor support bracket.

7. A power wheelchair according to claim 5, wherein the at least one anti-tip idler wheel is connected to the drive assembly.

8. A power wheelchair according to claim 5, wherein there are two anti-tip idler wheels, one anti-tip idler wheels being mounted on either side of said frame and attached to a respective drive assembly/motor support bracket combination.

9. A power wheelchair according to claim 5, wherein the drive assemblies are attached to the motor support bracket forward of the pivotal attachment to the frame.

10. A power wheelchair according to claim 5, further comprising a second pair of springs, the first pair of springs counter-act pivoting of the motor support bracket in a first direction and the second pair of springs counter-acting pivoting of the motor support bracket in a second, opposite direction.

11. A power wheelchair according to claim 5, wherein there are two front idler wheels, one proximate to each lateral side of the frame.

12. A power wheelchair according to claim 5, wherein the frame includes at least two longitudinal beams, each longitudinal beam having an upright support and a crossbar connecting each upright support, and wherein the springs are coil springs disposed between each upright support and the motor support bracket.

13. The power wheelchair of claim 5, wherein the frame includes at least two longitudinal beams, each longitudinal beam having an upright support and a crossbar connecting each upright support, and wherein there are two sets of springs, each set of springs including a strut, the lower end of the strut attached to the motor support bracket, each upright support having an upright bracket assembly through which the strut extends, and wherein one of the springs in each set is located above the upright bracket assembly and the other spring is located between the upright bracket assembly and the motor support bracket.

14. A vehicle comprising:
a frame;
a pair of drive wheels positioned on opposing sides of the frame and normally engaging the ground, each drive wheel having an axis of rotation positioned transverse to the frame;
at least one ground-engaging idler wheel connected to the frame in front of said drive wheels;
a pair of drive assemblies, each drive assembly rotating a respective drive wheel about its axis of rotation for propulsion of the vehicle, each drive assembly pivotally attached to the frame, and at least a portion of the drive assembly extending rearwardly from the pivot at an upward angle with respect to the plane of the ground surface; and
at least one anti-tip wheel fixedly attached to one drive assembly and extending rearwardly therefrom such that pivoting of the drive assembly about its pivotal attachment to the frame produces a corresponding pivotal movement of the anti-tip wheel.

15. The vehicle as claimed in claim 14, wherein the pivotal mounting of the drive assembly is positioned rearward of the corresponding drive wheel axis.

16. The vehicle as claimed in claim 14 further comprising a support bracket attached to the motor assembly, at least a portion of the bracket extending forwardly of the pivotal attachment to the frame, and further comprising a resilient strut fixedly attached at one end to the bracket and at an opposing end to the frame, the strut resiliently biasing the movement of the drive wheels about the pivotal mounting.

17. The vehicle as claimed in claim 14, further comprising at least one battery for powering the drive assemblies, the battery supported on the frame at a position substantially rearward of the drive wheel axis.

18. The vehicle as claimed in claim 14 wherein each of the drive assemblies comprises a linearly positioned electric motor and transmission combination, and a drive shaft extending transverse to the linear combination, the drive shaft driving the rotation of the drive wheel.

19. The vehicle as claimed in claim 14, wherein the pivotal attachment of the drive assembly to the frame permits the moment create by the torque of the drive assembly in driving the respective drive wheel to rotate the anti-tip wheel about the pivotal mounting.

* * * * *

UNITED STATES PATENT AND TRADEMARK OFFICE
CERTIFICATE OF CORRECTION

PATENT NO.         : 7,234,554 B2                                    Page 1 of 1
APPLICATION NO.    : 10/613663
DATED              : June 26, 2007
INVENTOR(S)        : Mulhern et al.

It is certified that error appears in the above-identified patent and that said Letters Patent is hereby corrected as shown below:

<u>In Column 3</u>
At line 46, change "not" to --no--.

Signed and Sealed this

Eighteenth Day of September, 2007

JON W. DUDAS
*Director of the United States Patent and Trademark Office*